United States Patent [19]

Fleming

[11] 4,260,919
[45] Apr. 7, 1981

[54] VARIABLE SPEED ELECTRIC MOTOR TRANSMISSION

[76] Inventor: John B. Fleming, 36 Woodlawn St., Rochester, N.Y. 14607

[21] Appl. No.: 955,139

[22] Filed: Oct. 26, 1978

[51] Int. Cl.³ .......................................... H02K 47/14
[52] U.S. Cl. .................................................. 310/113
[58] Field of Search ............................ 310/111–115, 310/116, 118, 124, 126, 179, 180, 184; 322/16

[56] References Cited

U.S. PATENT DOCUMENTS

| 1,413,158 | 4/1922 | Caple | 310/113 X |
| 2,539,459 | 1/1951 | Myrmirides | 310/113 |
| 2,552,542 | 5/1951 | Duerr, Jr. | 310/113 X |
| 2,778,960 | 1/1957 | Anderson | 310/113 |
| 3,931,535 | 1/1976 | Roesel, Jr. | 310/113 |

Primary Examiner—Mark O. Budd

[57] ABSTRACT

A variable speed electrical mechanical transmission with torque sensing, using two sets of sun and planet gears, between D.C. motor and generator sections.

2 Claims, 7 Drawing Figures

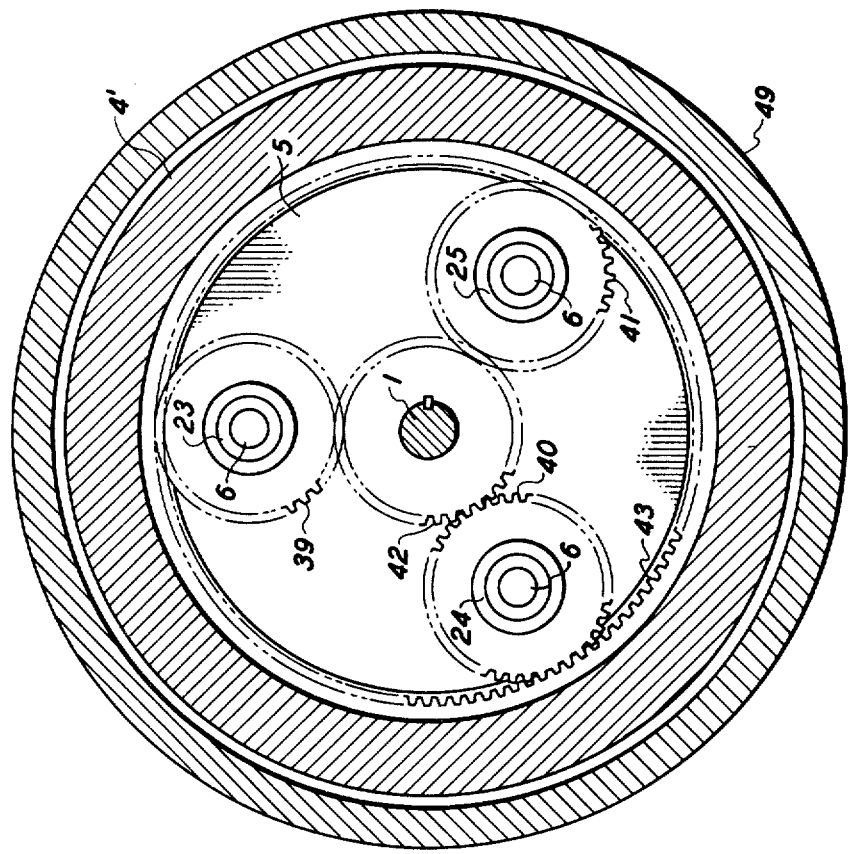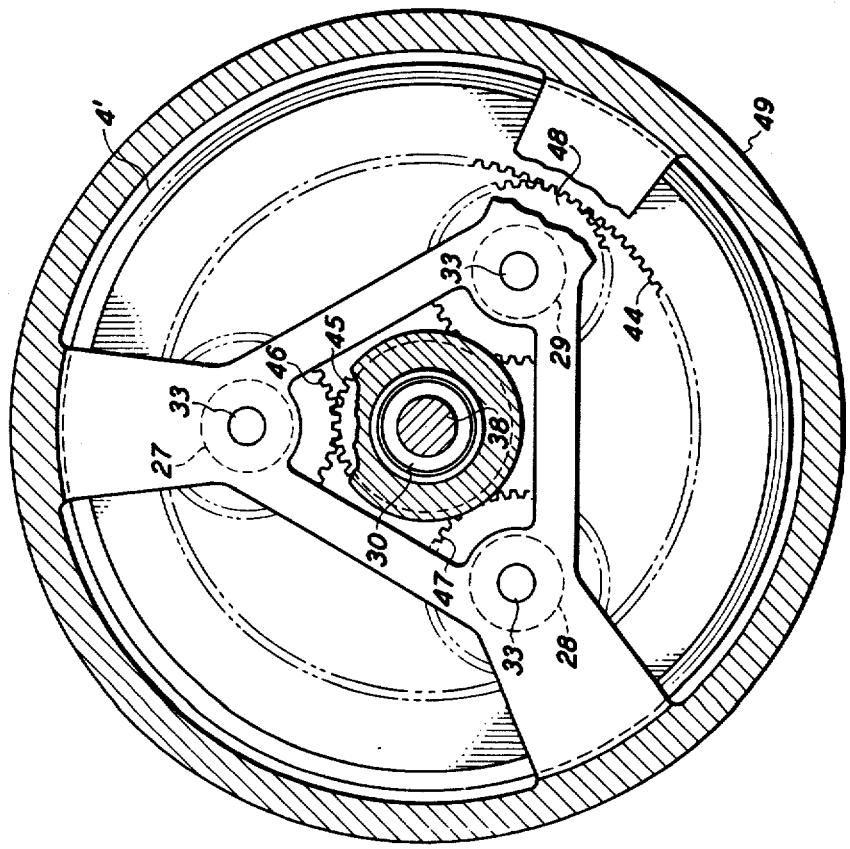

VARIABLE SPEED ELECTRIC MOTOR TRANSMISSION

This invention relates to the electrical mechanical transmission of power by means of a shunt wound direct current generator coupled to a series wound direct current motor by a five member planetary gear set. Through electrical control of the generator an infinite variation in output speeds is available. Variations in the torque requirements of the load shaft are reflected back through the planetary sets to automatically change the generator output without necessitating a change in the generator electrical control circuit.

The object of this invention is to provide a self regulating output speed due to the differentiating action between the motor and generator by means of a five member planetary set.

Another object of this invention is to provide the same differentiating action between motor and generator by means of a three member planetary gear set to accomodate a very low input rotational speed.

Another object of this invention is to provide for an infinitely variable output speed through control of the generator field or by a variation in input speeds.

Another object of this invention is that the output speed once changed by the generator control circuit will tend to remain stable under varying load requirements due to the differentiating action between the generator and motor rotational speeds.

In the accompanying drawings the main mechanical features are shown and also one method of electrical control of output.

Figure 1:
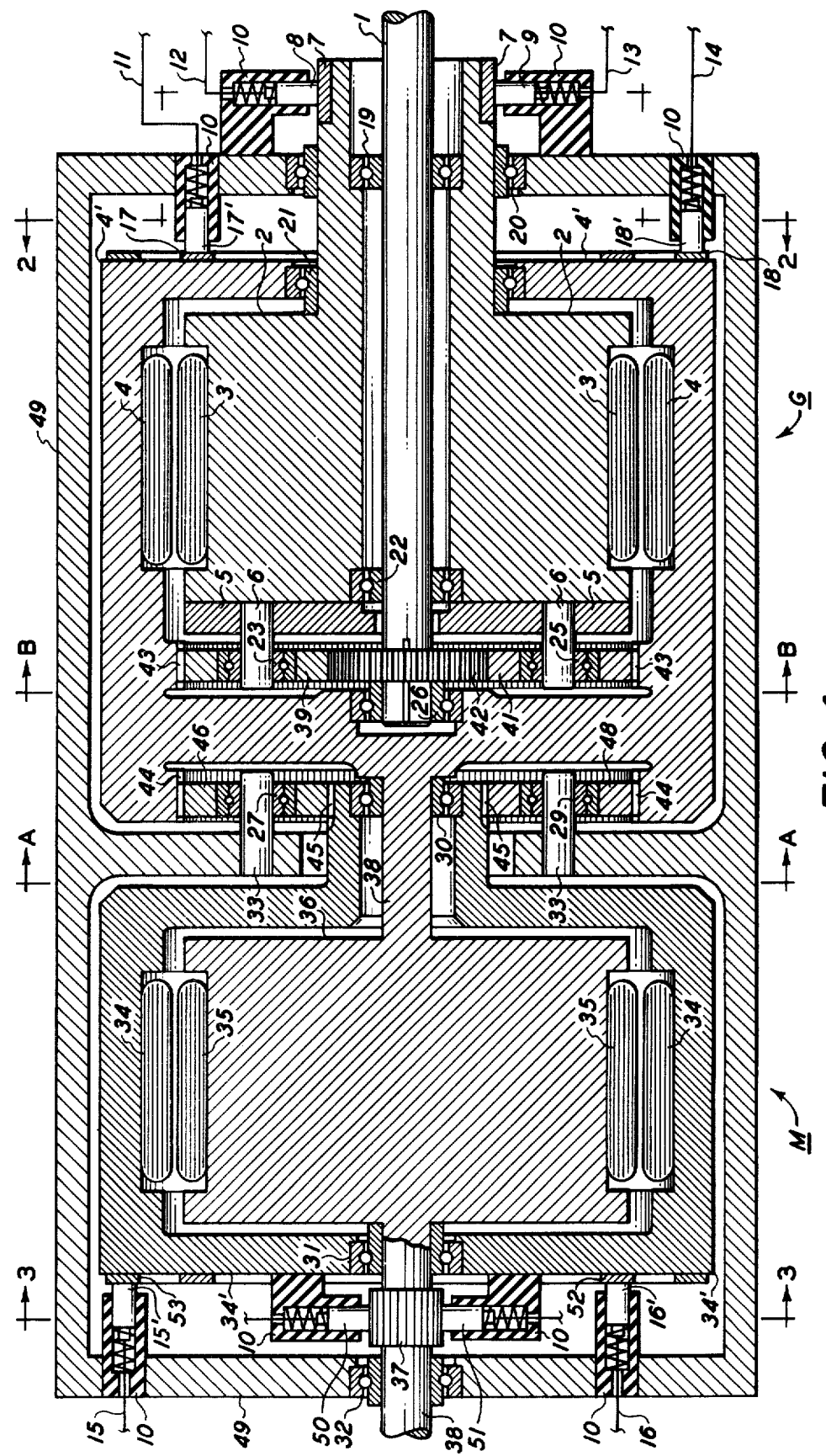
FIG. 1 is a longitudinal section through the transmission assembly.
Figure 2:
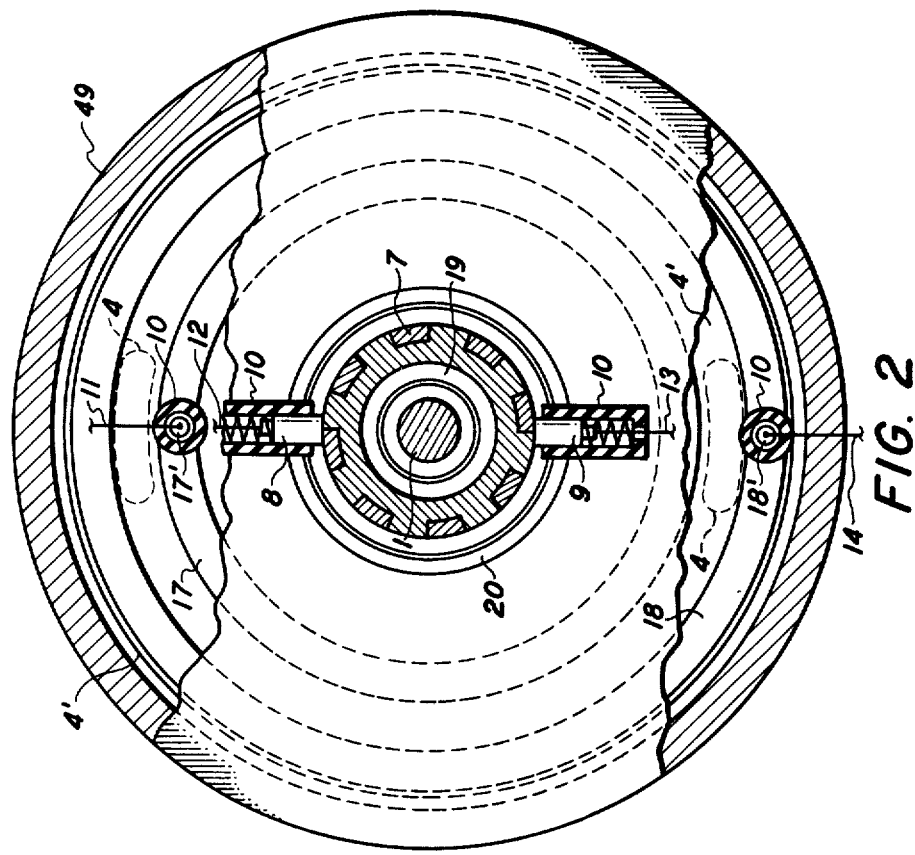
FIG. 2 is a cross-section on line 2—2 of FIG. 1.
Figure 3:
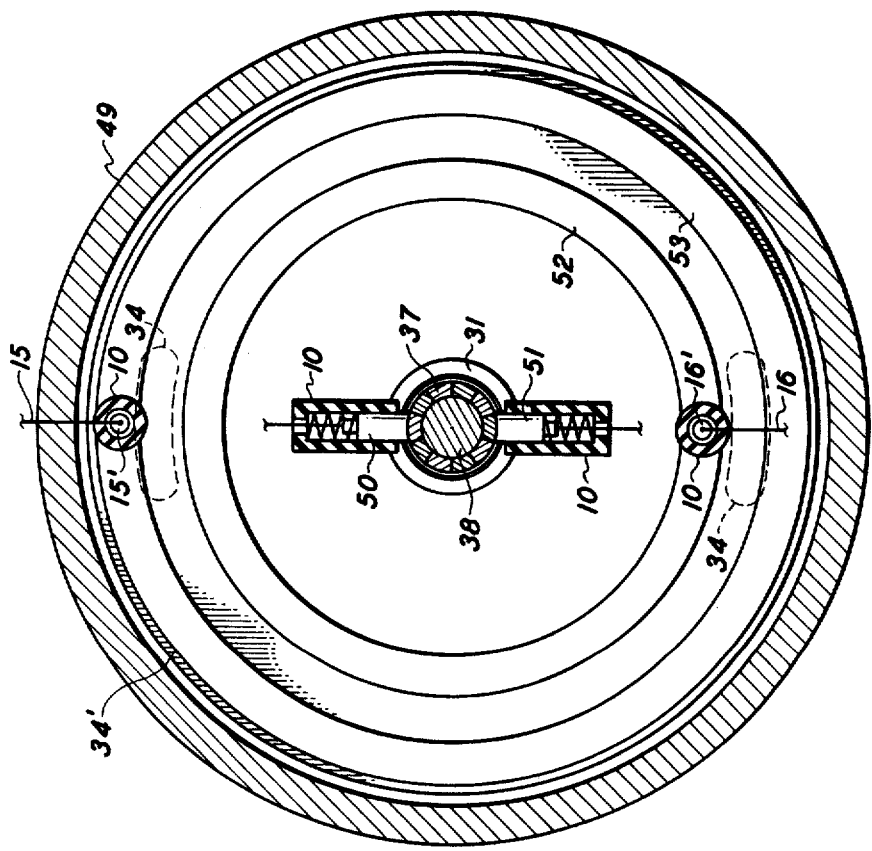
FIG. 3 is a cross-section on line 3—3 of FIG. 1.

FIG. B is a cross-section on line B—B of FIG. 1.

FIG. A is a cross section on line A—A of FIG. 1.

In FIG. 1 the parts are as follows:
1. input shaft.
2. generator armature drum.
3. generator armature windings.
4. generator field windings.
4'. generator field windings housing.
5. generator drum mounting ring.
6. stub shafts.
7. generator armature commutator.
8-9. generator commutator brushes.
10. brush holders and pressure springs.
11-16. electrical leads and brushes.
17-18. generator slip rings.
19-32. bearings.
33. stub shafts.
34. motor field windings.
35. motor armature windings.
36. motor armature drum.
37. motor commutator.
38. output shaft.
39-41. planet gears of B set.
42. sun gear of B set.
43. ring gear of B set.
44. ring gear of A set.
45. sun gear of A set.
46-48. planet gears of A set.
49. frame assembly.
50-51. motor commutator brushes.
52-53. motor slip rings.
54. generator field control rheostat.

In describing the mechanical construction of the transmission using FIG. 1 we have the input shaft 1 is fixed to the sun gear 42 of B planetary set and runs free through the center of the generator armature drum 2. The armature of the generator constitutes the planet carrier of B planetary set by means of the generator drum mounting ring 5 and stub shafts 6 which are fixed to the generator armature drum. The field of the generator 4' is an integral part of ring gears 43, 44 of planetary sets A and B. The field 34' of the motor is an integral part of the sun gear 45 of A planetary set. The armature 36 of the motor is an integral part of ring gears 43, 44 of planetary sets A and B. Ring gears 43, 44 are each one half of the ring gear of A and B planetary sets. The A planetary gear set carrier for the planet gears 46, 47, 48 is fixed to the frame by stub shafts 33. The output shaft 38 is an integral part of the motor armature drum 36. Low friction bearings 19 through 32 are used in a manner to assure mechanical rigidity.

Figure 4:
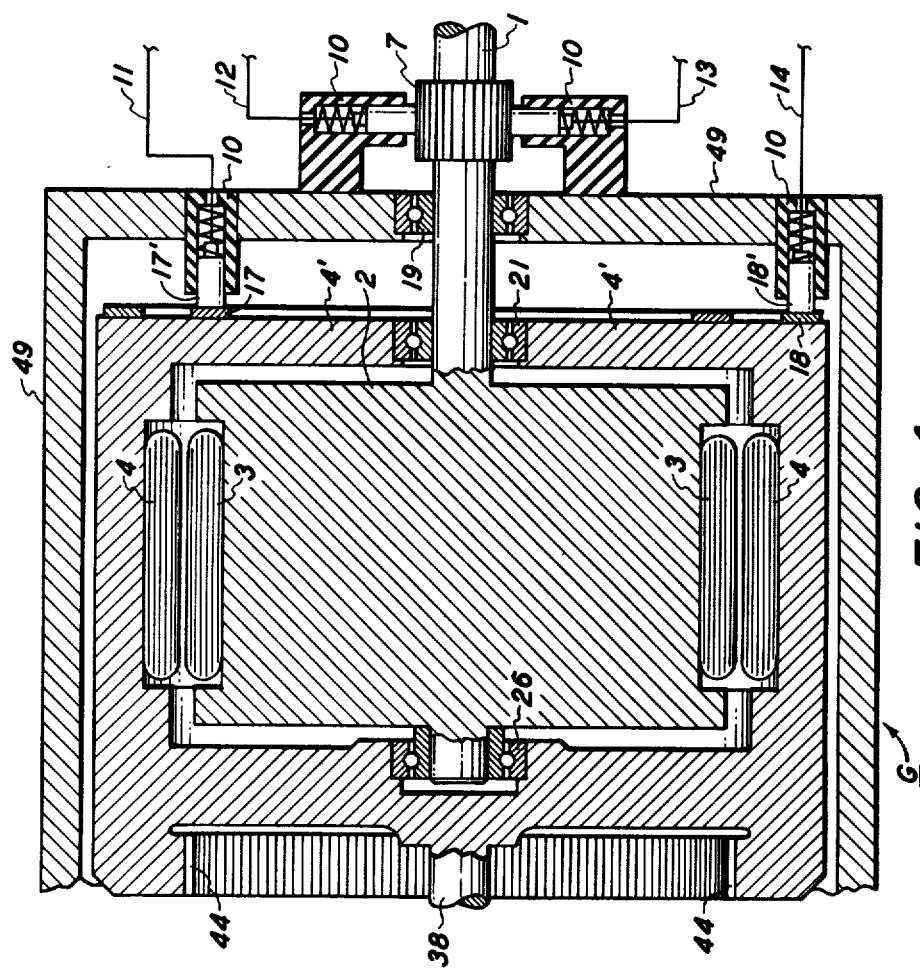
FIG. 4 is a longitudinal section through the generator section when a planetary gear reduction is not used.

In FIG. 4 the planetary set B, 42, 43, 39, 40, 41 is not used which also eliminates parts 5 and 6. The input shaft 1 becomes an integral part of the generator armature drum 2 and also carries the generator armature commutator 7. Bearings 20, 22, 23, 24, 25 are not used.

The mechanical and electrical description does not intend to set a rigid construction design, the relative size of components, the gear ratios, electrical controls and types of motors and generators that can be used to produce the self-regulated output by the differentiating action.

Figure 5:
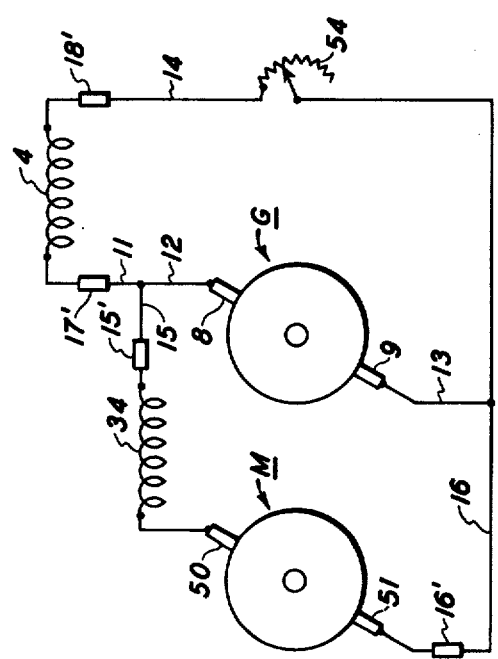
FIG. 5 shows one method of electrical control and circuits between generator and motor.

One method of electrical control of the transmission is shown by FIG. 5. The rheostat is designed to completely cut off the current flow of the generator by having an open or off position. A typical current flow or direction depending on the windings of the unit would be as follows:

A current from the generator armature 7 to brush 9 to lead 13 which is connected to lead 16 which in turn is connected to brush 16' of the motor. Brush 16' contacts ship ring 52 of the motor. Slip ring 52 is internally connected to brush 51 on the motor commutator. Current flows from the contacted armature segment through the armature winding to the opposite segment and brush 50. Brush 50 is internally connected to one end of a motor field winding. The other end of the same winding is connected to slip ring 53. Brush 15' contacts slip ring 53 and transmits the current to lead 15 which is connected to lead 12. Lead 12 is connected to brush 8 which is on the opposite segment of the generator armature on which brush 9 was located at the beginning of the current path.

The rheostat is in series with the field windings. The current flow would be as follows;

A current from brush 9 to lead 13 which is connected to the sliding contact of the rheostat, then to the resistor section. Through the resistor to lead 14 which is connected to brush 18'. Brush 18' rests on slip ring 18. Slip ring 18 is connected to one end of a generator field winding. The other end of the same winding is connected to slip ring 17. Brush 17' rests on slip ring 17 and transmits the current to lead 11. Lead 11 is connected to lead 12 which is connected to brush 8 which rests on the opposite segment of the generator armature to which brush 9 and lead 13 are in contact which thus completes the current path.

FIG. 1 shows that brush holders 10 and brushes 17', 18', 15', 16', 8 and 9 are fixed to the frame and thus do not move. Brush holders and brushes 50 and 51 are fixed to the motor field housing and rotate in syncronization with the motor armature commutator segments.

FIG. 4 shows the generator armature to be fixed directly to the input shaft. The planetary gear set B which was used mainly for a reduction in rotational speed of the generator armature from a high speed input is not used when the prime power source has a normally low operating speed. The electrical operation of the generator is the same as in FIG. 1.

I claim:

1. An electrical mechanical variable speed torque sensing transmission composed of a motor generator housing, an input shaft rotatably mounted within said housing, a first sun gear mounted near one end of said input shaft, a generator armature surrounding said shaft, a generator field surrounding said generator armature, a first set of planet gears mounted on stub shafts fixed to one end of said generator armature and cooperating with said first sun gear, a ring gear integral with one end of said generator field, a first side of said ring gear surroundingly cooperating with said first set of planet gears so that the generator armature and the generator field are both free to rotate about said input shaft within the housing, a second set of planet gears cooperating with the second side of said ring gear, the second set mounted on stub shafts fixed relative to the housing, a motor armature fixed at one end of the second side of said ring gear, a motor field surrounding said motor armature, a second sun gear fixed to one end of the motor field and cooperating with said second set of planet gears so that the motor field and motor armature are rotatable relative to said housing and each other, an output shaft fixed to the opposite end of the motor armature from the ring gear and rotatably supported in said housing, electric controls and circuits connecting said motor and generator for direct current operation.

2. An electrical mechanical variable speed torque sensing transmission composed of a motor generator housing, an input shaft rotatably mounted within said housing, a generator armature fixed to said input shaft, a planetary gear set whose planet gears are mounted on stub shafts fixed relative to the housing, a generator field rotatably mounted and surrounding said generator armature and free to rotate relative to said generator armature and motor generator housing and fixed to one end of the motor armature and to the ring gear of the planetary set, a motor armature fixed at one end to said ring gear, a motor field surrounding said motor armature, a sun gear fixed to one end of the motor field and cooperating with said planet gears so that the motor field and motor armature are rotatable relative to said housing and each other, an output shaft fixed to the opposite end of the motor armature from the ring gear and rotatably supported in said housing, electric controls and circuits connecting said motor and generator for direct current operation.

* * * * *